United States Patent [19]

Kim

[11] Patent Number: 5,517,875

[45] Date of Patent: May 21, 1996

[54] GEAR SHIFTING DEVICE OF A PNEUMATIC TRANSMISSION

[75] Inventor: Yu-Kyeom Kim, Ulsan, Rep. of Korea

[73] Assignee: Hyundai Motor Company, Seoul, Rep. of Korea

[21] Appl. No.: 330,699

[22] Filed: Oct. 28, 1994

[30] Foreign Application Priority Data

Oct. 29, 1993 [KR] Rep. of Korea .................. 93-22775

[51] Int. Cl.⁶ .................................................. F16H 61/00
[52] U.S. Cl. .................................. 74/335; 192/109 F
[58] Field of Search .................. 74/335, 104; 192/109 F; 73/118.1

[56] References Cited

U.S. PATENT DOCUMENTS

| | | | |
|---|---|---|---|
| 1,612,481 | 12/1926 | Welter | 74/104 |
| 2,137,939 | 11/1938 | Eaton | 74/335 |
| 2,137,953 | 11/1938 | Rowley | 74/335 |
| 2,137,961 | 11/1938 | Vorech | 74/335 |
| 2,157,592 | 5/1939 | Casler | 74/335 |
| 2,200,013 | 5/1940 | Sanford | 74/335 |
| 2,346,820 | 4/1944 | Casler et al. | 74/335 |
| 2,432,712 | 12/1947 | Bachman et al. | 74/335 |
| 2,451,160 | 10/1948 | Eaton | 74/335 |
| 4,718,307 | 1/1988 | Yabe et al. | 74/335 X |
| 4,928,544 | 5/1990 | Markyvech et al. | 74/335 X |
| 5,307,013 | 4/1994 | Santos et al. | 74/475 X |
| 5,450,767 | 9/1995 | Willford et al. | 74/335 |

FOREIGN PATENT DOCUMENTS 91-3950 6/1991 Rep. of Korea .

Primary Examiner—Charles A. Marmor
Assistant Examiner—David Fenstermacher
Attorney, Agent, or Firm—Finnegan, Henderson, Farabow, Garrett & Dunner

[57] ABSTRACT

A pneumatic transmission for a motor vehicle is provided with a gear shifting device which comprises a first pneumatic cylinder mounted to a housing for moving a shift arm fixed to a shift shaft thereof in predetermined shift positions, and a second pneumatic cylinder mounted to the housing and arranged in a cross relationship with the first cylinder for moving the shift arm in predetermined select positions. The second cylinder includes a selector shaft and a select rod slidably disposed therein in an axially spaced opposite relationship with each other, and select arms extending from ends of the selector shaft and the select rod to converge toward an end portion of the shift arm. A yoke is provided to interlink the select arms with the shift arm so as to move the shift arm in the predetermined select positions through the clockwise and counterclockwise rotation of the shift arm by a linear movement of the selector shaft. The gear shifting device includes a valve assembly for actuating individually the first and the second cylinders.

3 Claims, 7 Drawing Sheets

GEAR SHIFTING DEVICE OF A PNEUMATIC TRANSMISSION

FIELD OF THE INVENTION

The present invention relates to a manually operated transmission mechanism; and, more particularly, to a gear shifting device of a pneumatic transmission for a motor vehicle, which is capable of reliably operating a gear train mechanism mounted to a rear of the vehicle, while reducing an impact against a synchronizer ring of the gear train mechanism during the shifting operation of the device.

DESCRIPTION OF THE PRIOR ART

Generally, in the so-called rear-engine rear-wheel drive type of an automotive vehicle such as a bus, truck and the like, a gear train transmission mechanism is mounted to a rear of the vehicle and operated remotely by the manipulation of a manual lever. In such a case, various transmission types, e.g., a mechanical, a pneumatic and a hydraulic transmissions, may be employed to provide several forward drive ratios and one reverse drive ratio in the vehicle. The mechanical transmission includes a number of complex elements, e.g., intermediate rods and links, for transmitting the manipulation of the manual lever to the gear shift mechanism, thereby rendering it rather difficult to reliably produce the speed change operation thereof especially due to the frictional defacement between the intermediate transmitting elements in a long term use. The hydraulic transmission can provide a high reliability of the speed change but tends to entail a substantial power and fuel consumption. Further, the production cost of the device is relatively high.

On the other hand, the pneumatic transmission includes a remote control arrangement which is capable of reliably transmitting the driver's instruction through the manipulation of the manual lever to the gear train mechanism without employing the complex mechanical linkage. Therefore, there exist various advantages in the pneumatic transmission: the simplified construction, relatively low manufacturing cost, and accurate drive ratios. For these reasons, recent trend has been to equip the rear-engine rear-wheel drive vehicle with the pneumatic type of the transmission capable of providing a better performance and drivability. For example, Korean Patent Publication No. 91-3950 discloses a gear shifting arrangement for a pneumatic transmission which comprises a pair of pneumatic cylinders mounted to an outer wall of a case and arranged in a perpendicular relationship with each other, each pneumatic cylinder having two pistons movably disposed therein. A first slider is connected to a rod of the piston of the first cylinder and contained in the case wherein it is slided in a lateral direction by the actuation of the first cylinder. A second slider is connected to a rod of the piston of the second cylinder and slidably disposed on the first slider wherein it is slided in a longitudinal and a lateral directions by the actuation of the second and the first cylinders. A shift arm extends from a lower portion of the second slider through an elongate slot of the first slider for selective engagement with one of the shift forks of the transmission. In this gear shifting arrangement, the frictional contact between the first and the second sliders may reduce the operational efficiency of the transmission. Further, since compressed air is rapidly discharged from the pneumatic cylinders during the shifting operation of the arrangement, a synchronizer ring of a gear train mechanism is often subjected to an excessive impact when it couples with a synchronizer cone of the gear train mechanism, which may cause severe damages to the ring, leading to a premature failure of the transmission.

SUMMARY OF THE INVENTION

Accordingly, it is an object of the present invention to provide a gear shifting mechanism for a pneumatic transmission which is capable of substantially enhancing the operating performance of the transmission while substantially reducing frictional contact between the parts in a conventional pneumatic transmission.

It is another object of the present invention to provide a gear shifting device of a pneumatic transmission which prevents a rapid discharge of air from a pneumatic cylinder during the shifting operation of the device so as to minimize any damage to a synchronizer ring of the transmission.

The above and other objects of the present invention are accomplished by providing a gear shifting device of a pneumatic transmission for a motor vehicle, which comprises:

a housing;

a first pneumatic cylinder mounted to the housing, said first cylinder including a shift shaft slidably and rotatably disposed therein and a shift arm fixed to a portion of the shift shaft;

a second pneumatic cylinder mounted to the housing and arranged in a substantially cross relationship with said first cylinder, said second cylinder including a selector shaft and a select rod slidably disposed therein in an axially spaced opposite relationship with each other, and select arms extending from ends of the selector shaft and the select rod to converge toward an end portion of the shift arm, wherein each of said first and second cylinders includes a guide ring secured to each of the shift shaft and the selector shaft and located in a chamber thereof, a pair of separate pistons slidably interposed between an inner wall of each of the cylinders and the guide ring for dividing the chamber into two subchambers, and stoppers attached to the inner wall of each of the cylinders at a boundary of the subchambers for restricting the stroke of the pistons in the chamber;

a yoke for interlinking the shift arm of the first cylinder with the select arms of the second cylinder so as to convert a linear movement of the selector shaft into the clockwise and counterclockwise rotation of the shift arm; and a valve assembly for actuating individually the first and the second cylinders, wherein the shift arm is moved in its predetermined select and shift positions by the individual actuation of the cylinders.

BRIEF DESCRIPTION OF THE DRAWINGS

The above and other objects, features and advantages of the present invention will become apparent from the following detailed description of preferred embodiments given in conjunction with the accompanying drawings, wherein.

DETAILED DESCRIPTION OF THE PREFERRED EMBODIMENTS

Figure 1:
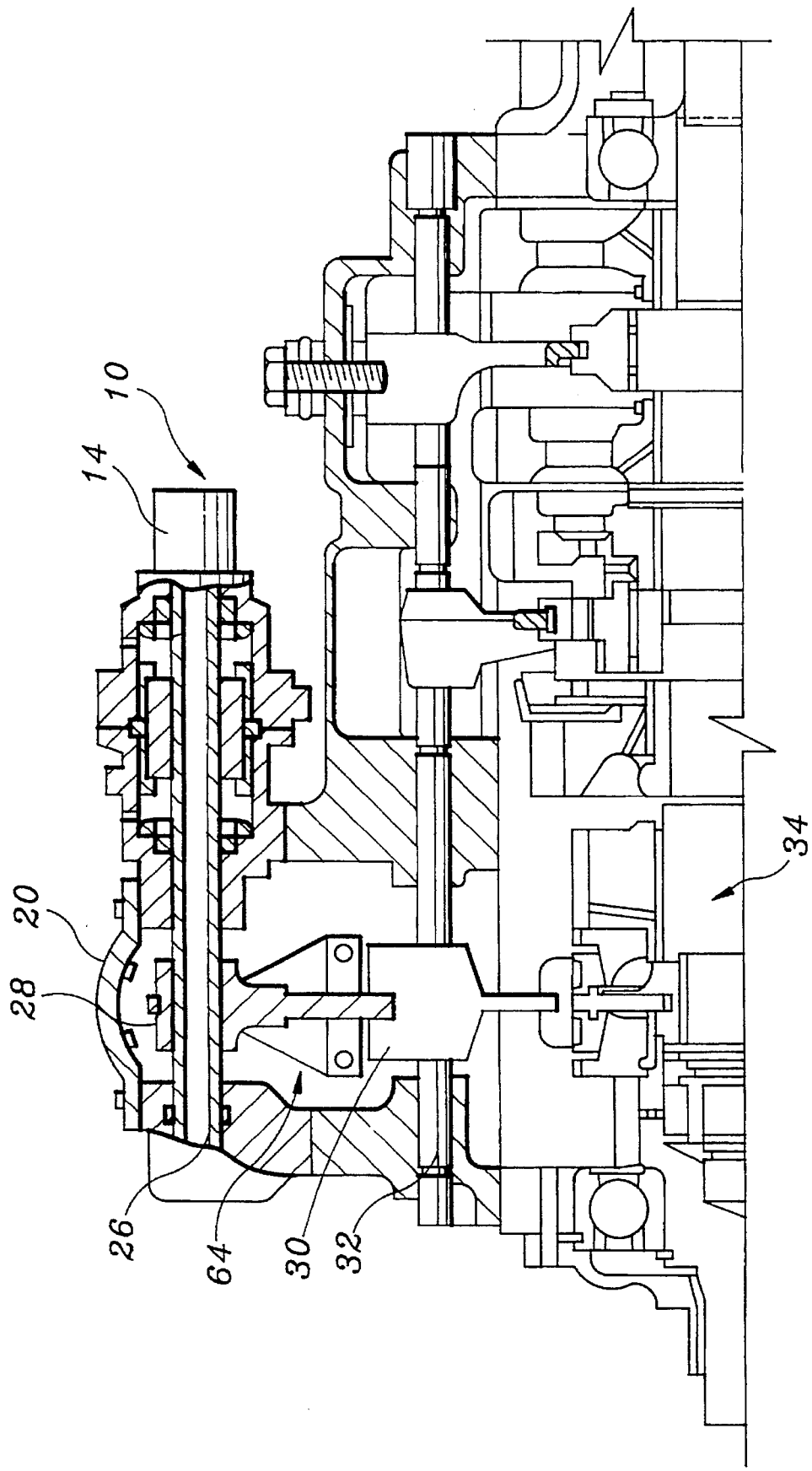
FIG. 1 is a fragmentary cross sectional view of a pneumatic transmission with parts broken away for clarity, in accordance with a preferred embodiment of the present invention.
Figure 2:
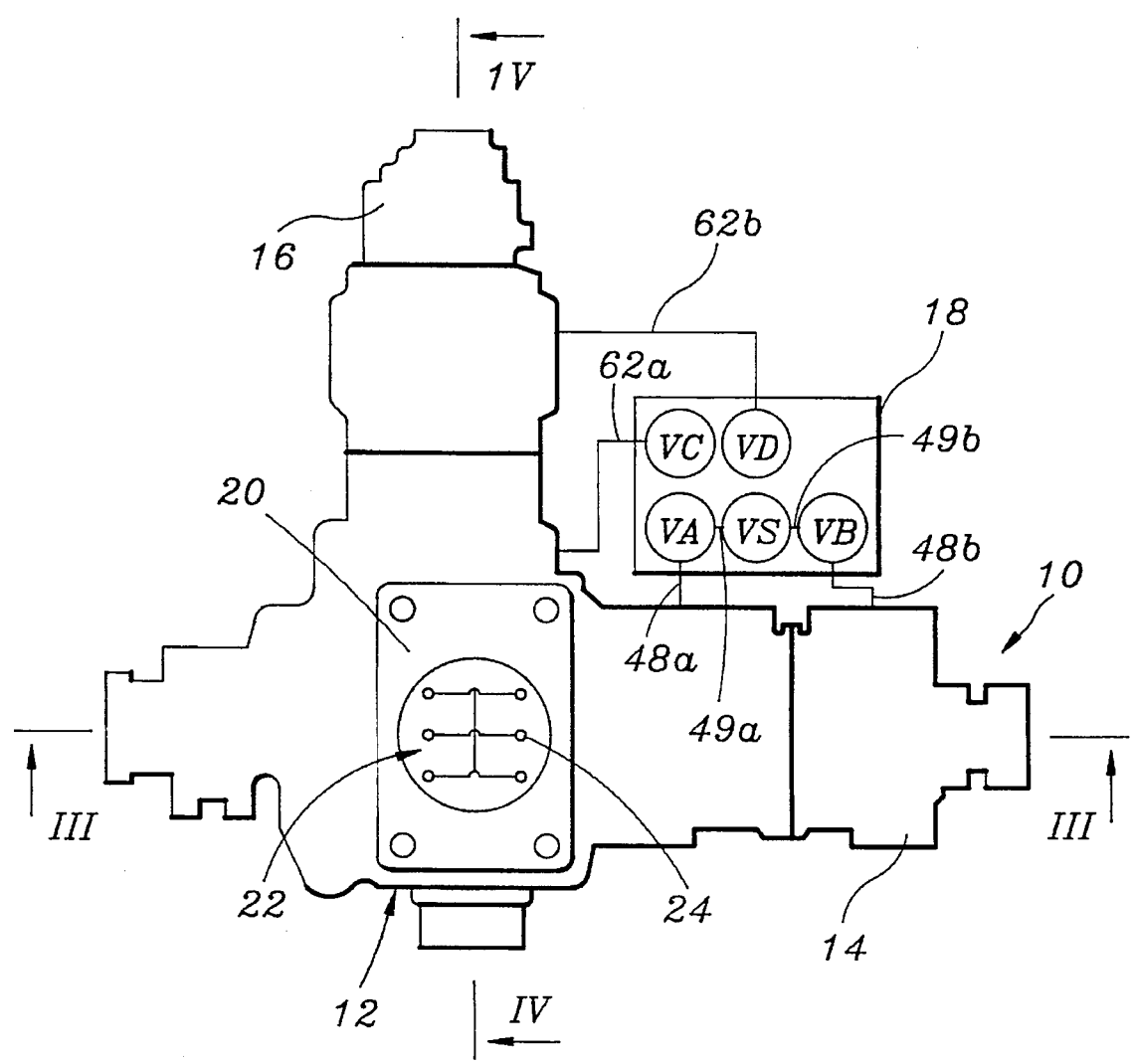
FIG. 2 is a plan view of a gear shifting device shown in FIG. 1 with parts cut away for the sake of brevity.

Referring now to FIGS. 1 and 2, there is schematically shown a gear shifting device of a pneumatic transmission generally designated with reference numeral 10, in accordance with a preferred embodiment of the present invention, which is adapted for use in a rear-engine rear-wheel drive vehicle. As shown in FIG. 2, the gear shifting device 10 comprises a housing 12, a first pneumatic cylinder 14 mounted to the housing 12, and a second pneumatic cylinder 16 mounted to the housing 12 and arranged in a substantially cross relationship with the first pneumatic cylinder 14. Further, the device 10 includes a valve assembly 18 for individually controlling the actuation of the pneumatic cylinders 14,16, the valve assembly 18 consisting of five solenoid valves VA, VB, VC, VD and VS. One pair of the solenoid valves VA, VB of the valve assembly 18 is in communication with the first pneumatic cylinder 14 and another pair of the solenoid valves VC, VD in communication with the second pneumatic cylinder 16 so as to individually supply and discharge a compressed air to and from the respective cylinders 14, 16. The remaining valve VS is interconnected to the solenoid valves VA, VB; and serves as a regulator valve for preventing a rapid discharge of the air from the first cylinder 14 therethrough during the shifting operation of the device. Preferably, each of the solenoid valves may be a typical three way valve which is adapted to switch its passages in a proper orientation. The actuation of the solenoid valves will be described in detail hereinbelow with reference to the pneumatic cylinders 14, 16. The housing 12 is provided with a cover 20 secured thereon, which has a contactless switch means 22 for sensing an operational state of the gear shifting device. In accordance with a preferred embodiment of the present invention, the contactless switch means 22 includes six lead switches 24 which are arranged to sense, e.g, first to fifth forward speed positions and one reverse speed position of the device as will be further described hereinbelow.

Figure 3:
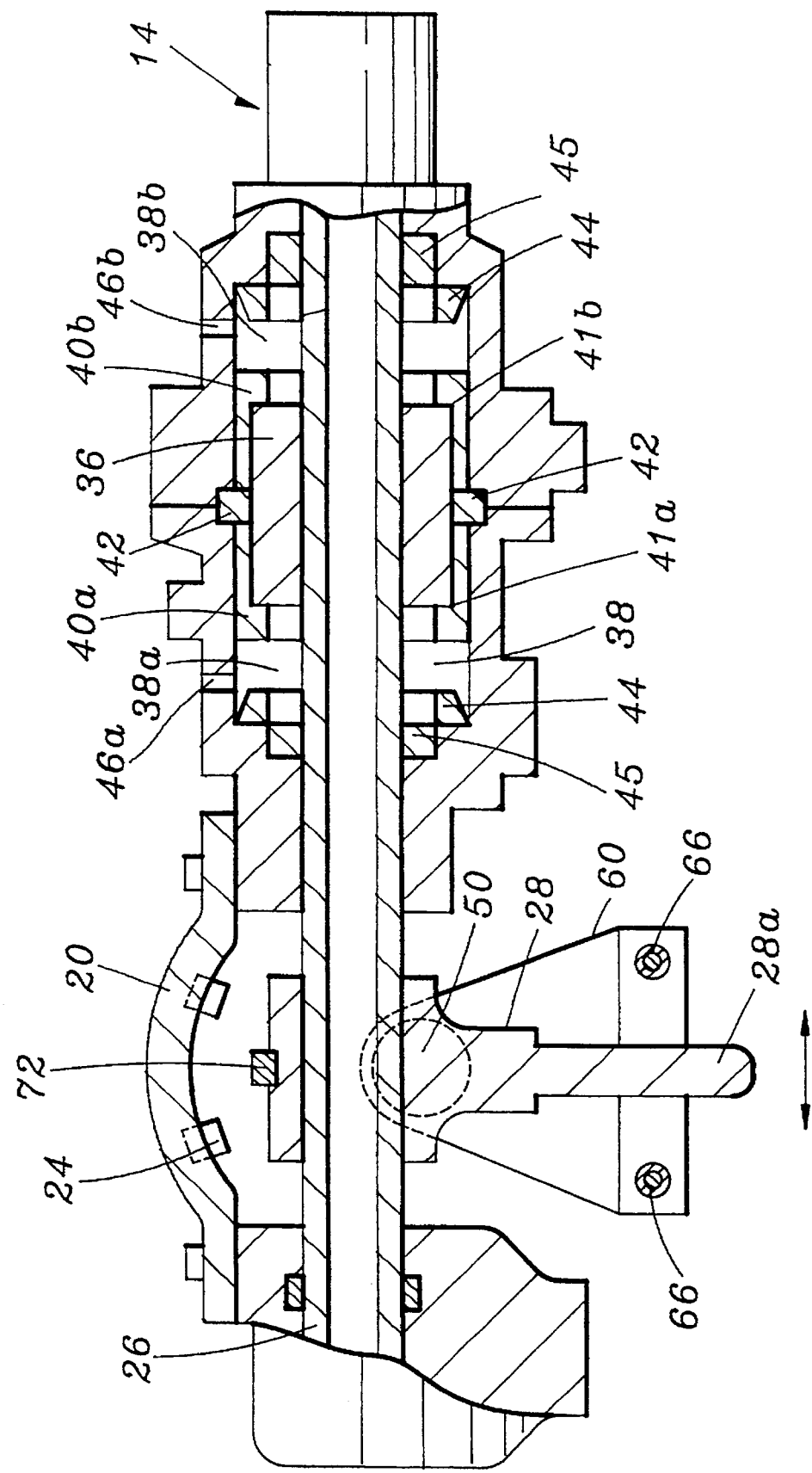
FIG. 3 is a partial cross sectional view taken along line III—III depend in FIG. 2.

As best shown in FIG. 3, a shift shaft 26 is disposed in the first pneumatic cylinder 14 so that it can be slided in a lateral direction during the shifting operation of the device and be rotated clockwise and counterclockwise during the selecting operation of the device. Secured to a portion of the shift shaft 26 exposed in the housing 12 is a shift arm 28 which can be in a selective engagement with one of shift forks 30 immovably mounted to shift rails 32(see FIG. 1). Therefore, a lateral movement of the shift shaft 26 together with the shift arm 28 by the actuation of the first pneumatic cylinder 14 causes the shift fork 30 to move in a shifting direction, thereby operating a gear train mechanism 34 in a forward or reverse drive ratio.

Further, firmly fixed to the shift shaft 26 is a guide ring 36 which is located in a chamber 38 of the first cylinder 14. Slidably interposed between the guide ring 36 and an inner wall of the first cylinder 14 is a pair of separate pistons 40a, 40b which divide the chamber 38 of the first cylinder 14 into two subchambers 38a, 38b. The respective pistons 40a, 40b are provided with shoulders 41a, 41b at their inner portions, which are in a slidable engagement with the peripheral ends of the guide ring 36. In addition, attached to the inner wall of the first cylinder 14 at a boundary of the subchambers 38a, 38b are stoppers 42 extending toward the guide ring 36, which act to restrict the stroke of each piston 40a, 40b in the chamber 38, thereby preventing each of the pistons 40a, 40b from passing through the boundary of the subchambers 38a, 38b. Similarly, provided in the inner wall of the cylinder 14 at opposite sides of the chamber 38 are stop rings 44 suitable for limiting the lateral movement of the pistons 40a, 40b. Accordingly, the shift shaft 26 can be moved in its axial direction within a range of a given distance due to the contact of the pistons 40a, 40b with the stop rings 44 and the engagement of the guide ring 36 with the shoulders 41a, 41b of the pistons 40a, 40b. Interposed between the shift shaft 26 and the inner wall of the cylinder 14 near the stop rings 44 are sealants 45 which can prevent the leakage of the compressed air from the respective subchambers 38a, 38b. The first cylinder 14 is provided with ports 46a, 46b which enable the subchambers 38a, 38b to communicate with the first set of the solenoid valves VA, VB of the valve assembly 18 via lines 48a, 48b, respectively(see FIG. 2). Therefore, the selective supply and discharge of the air to and from one of the subchambers 38a, 38b of the first cylinder 14 through the solenoid valves VA, VB and the lines 48a, 48b will cause the shift shaft 26 to move in its axial direction, thereby enabling the shift arm 28 to be shifted in one of predetermined shift positions. Further, as discussed above, the regulator valve VS is interconnected to the solenoid valves VA, VB via lines 49a, 49b so that the compressed air can be discharged from the subchambers 38a, 38b to atmosphere through the solenoid valves VA, VB and the regulator valve VS. This renders it possible to relieve the rapid discharge of the compressed air from the subchambers 38a, 38b of the first cylinder 14 because of the air discharge delay by the regulator valve VS, thereby preventing a sudden movement of the shift arm 28 during the shifting operation of the device and, thus, minimizing any impact against a synchronizer ring(not shown) of the gear train mechanism 34.

Figure 4:
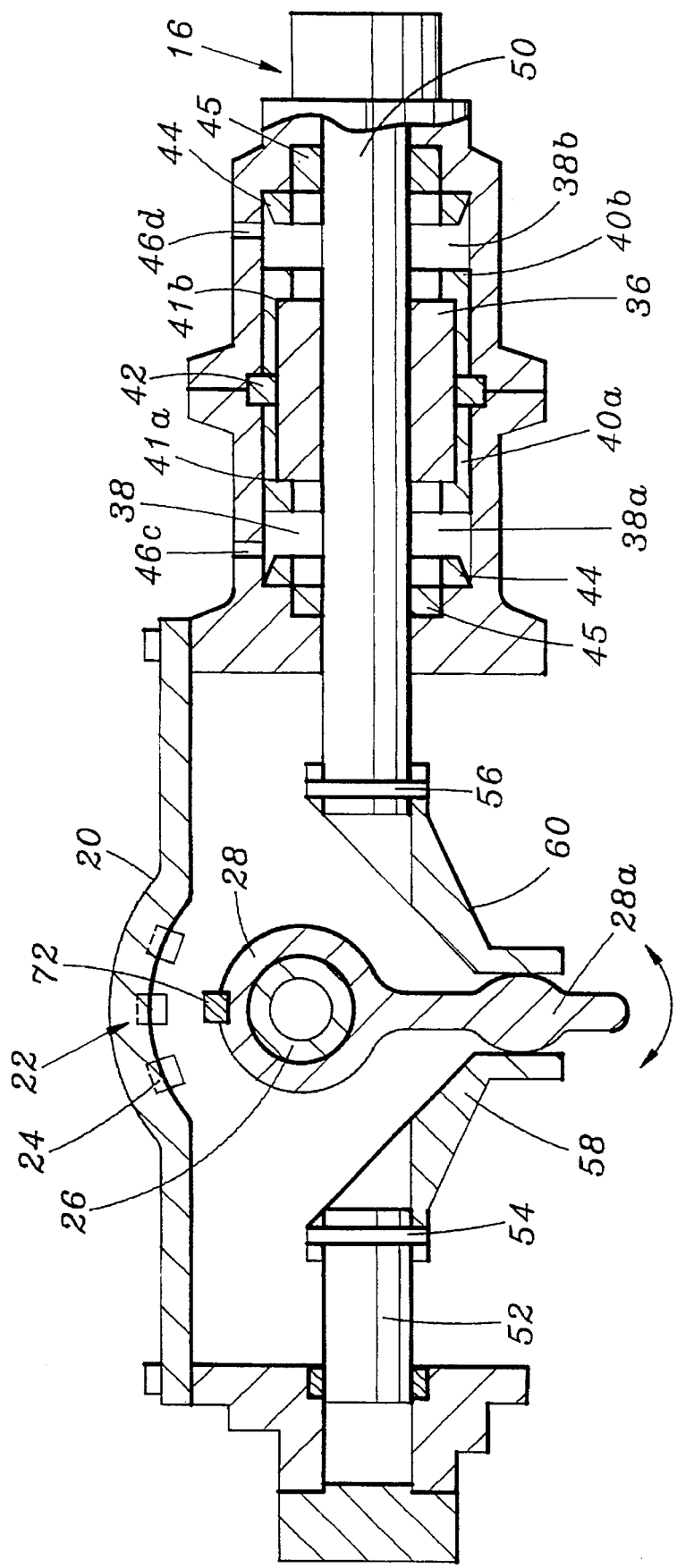
FIG. 4 is a partial cross sectional view taken along line IV—IV illustrated in FIG. 2.

FIG. 4 represents the second pneumatic cylinder 16 which carries out the selecting operation of the device. The structure of the second cylinder 16 is generally similar to that of the first cylinder 14 with the exception of a selecting mechanism provided thereat and, therefore, will not be further discussed herein for the purpose of avoiding the redundancy. The selecting mechanism of the second cylinder 16 includes a selector shaft 50 slidably disposed in one side of the second cylinder 16 and a select rod 52 slidably disposed in the other side of the second cylinder 16 in an axially spaced opposite relationship with the selector 50. In addition, secured to the ends of the selector shaft 50 and the select rod 52 by pins 54, 56 are select arms 58, 60 which extend to converge toward an end portion 28a of the shift arm 28. The second cylinder 16 is provided with ports 46c, 46d which allow the subchambers 38a, 38b to communicate with the solenoid valves VC, VD via lines 62a, 62b, respectively. Therefore, with the selective supply of the air to one of the subchambers 38a, 38b of the second cylinder 16 through the solenoid valves VC, VD and the lines 62a, 62b, the selector shaft 50 is moved in a longitudinal direction, thereby causing the shift arm 28 together with the shift shaft 26 to rotate clockwise and counterclockwise at a predetermined angle by the linear motion of the select arms 58, 60. As a result, the shift arm 28 reaches one of predetermined select positions.

Figure 5:
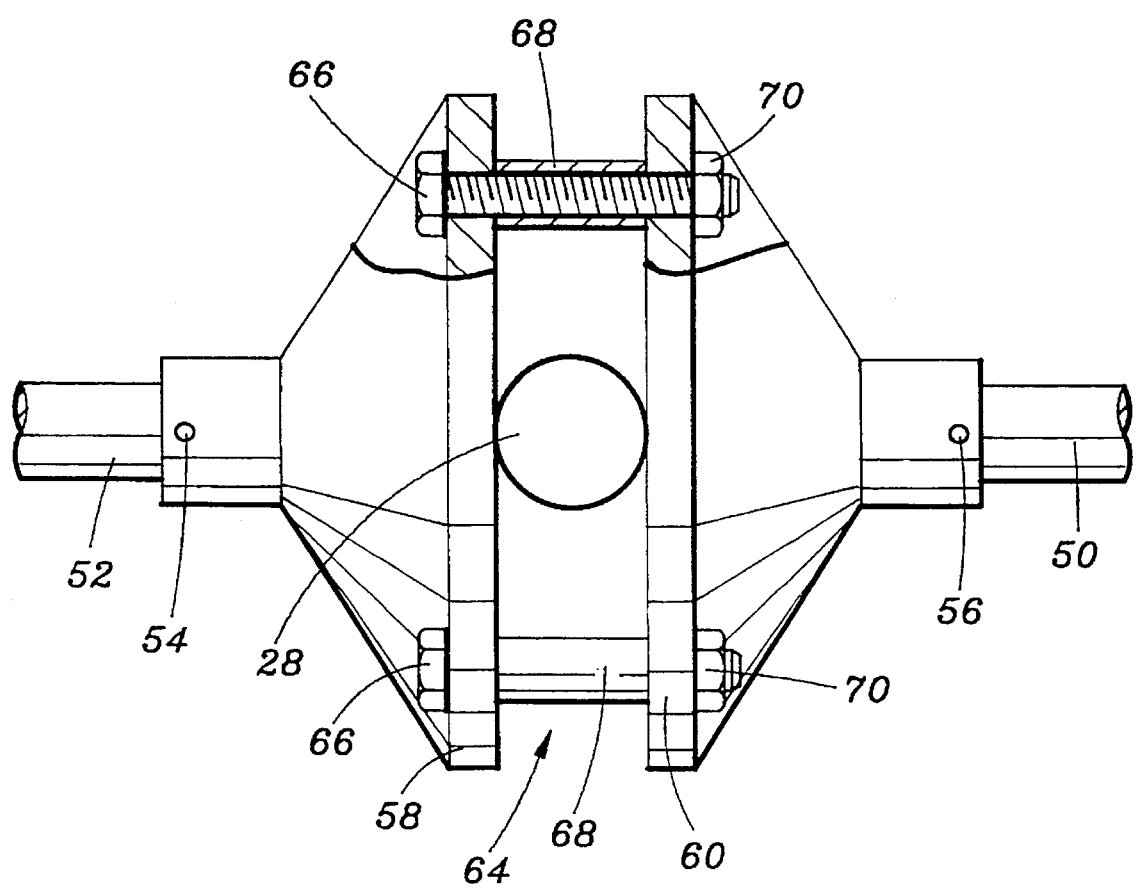
FIG. 5 represents a yoke interlinking a shift arm of a first cylinder with select arms of a second cylinder.

FIG. 5 illustrates a yoke 64 suitable for interlinking the shift arm 28 with the select arms 58, 60 in order to transmit the motion of the selector shaft 50 to the shift arm 28. This yoke 64 ensures that the linear movement of the selector shaft 50 is converted into the clockwise and counterclockwise rotation of the shift arm 28 by its interlinking. Further, in accordance with the present invention, the reciprocation of the select rod 52 is subject to the linear motion of the selector shaft 50 due to the interlinking of the yoke 64. Therefore, both the selector shaft 50 and the select rod 52 can be moved in the same direction. The yoke 64 is comprised of two bolts 66 passing through the select arms 58, 60 for locating the shift arm 28 therebetween, spacers 68 inserted around the bolts 66 for providing a small clearance between the shift arm 28 and the select arms 58, 60, and nuts 70 fixed to the bolts 66. In particular, the distance between the bolts 66 is designed to allow the shift arm 28 to be shifted in the shift positions during the actuation of the first cylinder 14. Also, the existence of the small clearance enables the shift arm 28 to be smoothly shifted in the shift positions.

Referring back to FIG. 4, as discussed above, the cover 20 is provided with the six lead switches 24 at its inner wall, which are defined to correspond to the first to the fifth forward speed positions and one reverse speed position of the device(only three switches shown in FIG. 4). The shift arm 28 has a magnet 72 fixed to an upper portion thereof, which can face one of the lead switches 24 depending on the selective shifting operation of the shift arm 28. Accordingly, with the facing of the magnet 72 toward one of the switches 24, the contactless switch means 22 can sense the completion of a required shifting operation of the shift arm 28.

In accordance with a preferred embodiment of the present invention, the operation of the gear shifting device will now be described hereinbelow, with reference to FIGS. 6 and 7. It should be understood that the device may be operated in various speed positions so as to achieve first to fifth forward drive ratios and one reverse drive ratio of the gear train mechanism 34 depending on the manipulation of a manual lever(not shown). In this connection, only one of the various speed change operations of the device is selected for discussion herein for the sake of convenience.

Figure 6:
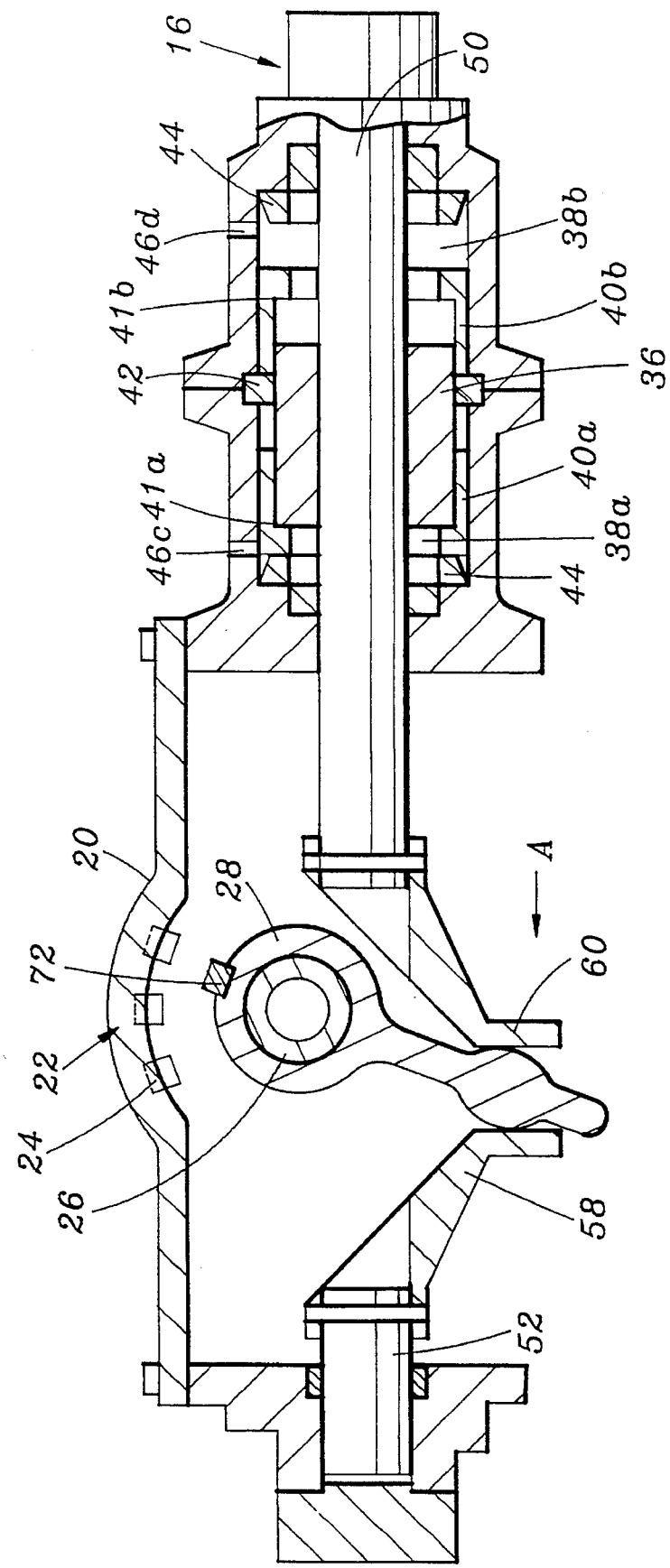
FIGS. 6 and 7 show a selecting and a shifting operations of the shift arm of the device, respectively.
Figure 7:
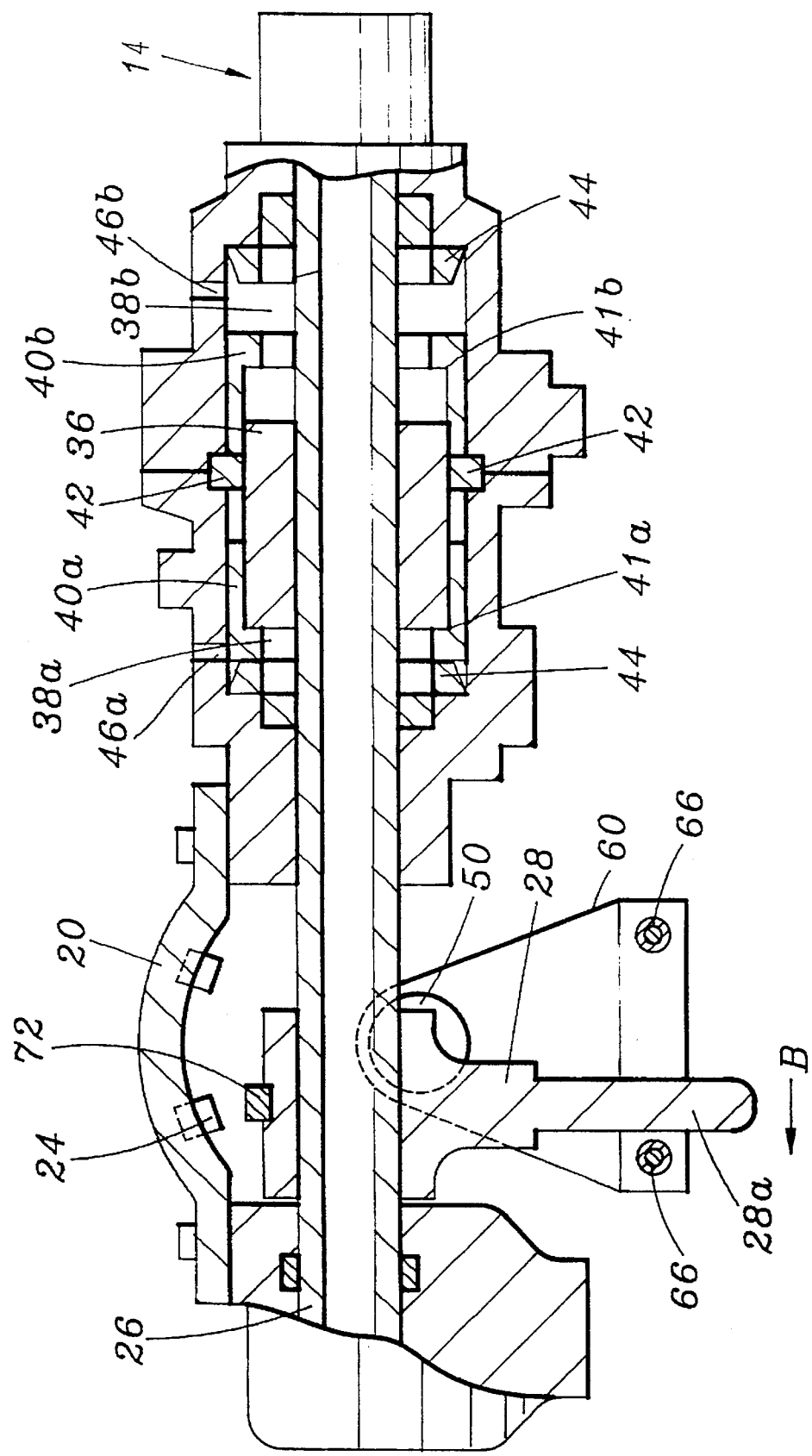

FIGS. 6 and 7 show an operating state of the shift arm 28 shifted from a neutral position represented in FIGS. 3 and 4 to one of the predetermined shift positions. For instance, in case of the neutral position of the shift arm 28, the solenoid valves VA, VB, VC, VD of the valve assembly 18 are actuated, with the regulator valve VS closed, to allow the air to enter into both of the subchambers 38a, 38b of the first and the second cylinders 14, 16. Therefore, the respective pistons 40a, 40b of the cylinders 14, 16 move toward the stoppers 42 because all of the subchambers have the same cross section area. As a result, both the shift shaft 26 and the selector shaft 50 become stationary, thereby maintaining the shift arm 28 in its neutral position.

As shown in FIG. 6, for example, the selecting operation of the device may be first carried out in order to achieve a required drive ratio of the transmission. In this example, according to the actuation of the solenoid valves VC, VD, based on the selecting manipulation of the manual lever(not shown), the air is supplied to the right side subchamber 38b of the second cylinder 16 from a tank(not shown) via the solenoid valve VD and the line 62b while the air filled in the left side subchamber 38a is discharged to the atmosphere through the line 62a and the solenoid valve VC, thereby causing the selector shaft 50 to move in the leftward direction as indicated with an arrow A until the piston 40a in the subchamber 38a contacts with the stop ring 44. Simultaneously, the select arms 58, 60 secured to the selector shaft 50 and the select rod 52 move in the same longitudinal direction. Therefore, the linear movement of the select arms 58, 60 will cause the shift arm 28 together with the shift shaft 26 to rotate clockwise at the predetermined angle due to the interlinking of the shift arm 28 with the select arms 58, 60 by the yoke 64, thereby selecting the shift arm 28 at a desired select position. As a result, the shift arm 28 engages with one of the shift forks 30 (see FIG. 1).

Thereafter, upon the termination of the selecting operation of the shift arm 28, the solenoid valves VA, VB and the regulator valve VS are actuated to carry out the shifting operation of the device according to the shifting manipulation of the manual lever. At this time, as shown in FIG. 7, the air in the left side subchamber 38a of the first cylinder 14 is discharged to the atmosphere through the lines 48a, the solenoid valve VA and the regulator valve VS in order, at the same time of supplying the air to the right side subchamber 38b via the solenoid valve VB and the line 48b, moving the shift shaft 26 in the leftward direction as indicated with an arrow B until the piston 40a of the first cylinder 14 contacts with the stop ring 44. As a result, the shift arm 28 reaches a desired shift position from its selected position, with the simultaneous movement of the shift fork 30 selected together with the shift rail 32(see FIG. 1), at which the magnet 72 of the shift arm 28 will be located to face one of the lead switches 24, sensing the completion of the shifting operation of the device by the contactless switch means 22. In accordance with the preferred embodiment of the present invention, since the air is discharged from the subchamber of the first cylinder 14 to the atmosphere at a low speed by means of the relieving operation of the regulator valve VS during the shifting operation of the device, the sudden movement of the shift arm 28 is prevented, minimizing any damages to the synchronizer ring(not shown) of the gear train mechanism 34 during the coupling of the synchronizer ring with a synchronizer cone(not shown). This ensures a longer life time of the synchronizer ring.

On the other hand, the change of the shift arm 28 from the shifted position to the neutral position can be performed in the reverse manner as described above. Further, depending on the design requirements of the transmission, the device may be so constructed that the shift arm is directly shifted in certain given shift positions with the removal of the selecting operation thereof, e.g, as in the third and the fourth forward drive ratios of the transmission.

Although the invention has been shown and described with reference to the particular embodiments, it will be apparent to those skilled in the art that many changes and modifications may be made without departing from the spirit and scope of the invention as defined in the following claims.

What is claimed is:

1. A gear shifting device of a pneumatic transmission for a motor vehicle, which comprises:

a housing;

a first pneumatic cylinder mounted to the housing, said first cylinder including a shift shaft slidably and rotatably disposed therein and a shift arm fixed to a portion of the shift shaft;

a second pneumatic cylinder mounted to the housing and arranged in a substantially cross relationship with said first cylinder, said second cylinder including a selector shaft and a select rod slidably disposed therein in an axially spaced opposite relationship with each other, and select arms extending from ends of the selector shaft and the select rod to converge toward an end portion of the shift arm, wherein each of said first and second cylinders includes a guide ring secured to each of the shift shaft and the selector shaft and located in a chamber thereof, a pair of separate pistons slidably interposed between an inner wall of each of the cylinders and the guide ring for dividing the chamber into two subchambers, and stoppers attached to the inner wall of each of the cylinders at a boundary of the subchambers for restricting the stroke of the pistons in the chamber;

a yoke for interlinking the shift arm of the first cylinder with the select arms of the second cylinder so as to convert a linear movement of the selector shaft into a clockwise and counterclockwise rotation of the shift arm, and a valve assembly for actuating individually the first and the second cylinders, wherein the shift arm is moved in its predetermined select and shift positions by the individual actuation of the cylinders, said valve assembly including two sets of solenoid valves adapted to supply and discharge compressed air to and from the subchambers of the respective cylinders, and a regulator valve interconnected with one set of the solenoid valves in communication with the subchambers of the first cylinder for preventing an abrupt discharge of the compressed air from the subchambers of the first cylinder to atmosphere therethrough during the shifting operation of the device.

2. The gear shifting device of claim 1, further comprising contactless switch means provided at a cover of the housing and an upper portion of the shift arm for sensing a shifted state of the shift arm, wherein said predetermined shift positions of the shift arm define first to fifth forward speed positions and one reverse speed position, respectively, and said contactless switch means includes six lead switches attached to the cover for corresponding to the respective speed positions and a magnet fixed to the upper portion of the shift arm for facing one of the lead switches depending on the selective shifting operation of the device.

3. The gear shifting device of claim 2, wherein said yoke includes bolts passing through the select arms for allowing the shift movement of the shift arm therebetween, spacers mounted around the bolts for providing a clearance between the select arms and the shift arm, and nuts fixed to ends of the bolts.

* * * * *